Jan. 11, 1955

R. L. JORDAN 2,699,499

FREQUENCY RESPONSIVE CIRCUIT

Filed Dec. 27, 1949

2 Sheets-Sheet 1

Robert L. Jordan
INVENTOR.

Jan. 11, 1955

R. L. JORDAN 2,699,499

FREQUENCY RESPONSIVE CIRCUIT

Filed Dec. 27, 1949

2 Sheets-Sheet 2

Robert L. Jordan
INVENTOR.

United States Patent Office 2,699,499

Patented Jan. 11, 1955

2,699,499

FREQUENCY RESPONSIVE CIRCUIT

Robert L. Jordan, Garland, Tex.

Application December 27, 1949, Serial No. 135,155

5 Claims. (Cl. 250—27)

My invention relates to frequency responsive circuits and more particularly to such circuits for actuating a relay in response to variations in the frequency of an alternating current.

In many applications it is necessary that variations in the frequency of an alternating current be detected quickly and accurately. For example, electric equipment designed to be operated by alternating current of a predetermined frequency may be damaged or destroyed by alternating currents of frequencies lower than the predetermined frequency. In some applications, the equipment may be damaged or destroyed by alternating currents of frequencies higher than the predetermined frequency. It is desirable therefore, to disconnect the equipment from the source of the alternating current when the frequency of the alternating current in one case exceeds the predetermined frequency and in the other case when it falls below the predetermined frequency. In some applications the frequency responsive circuit must be capable of detecting very small deviations from the predetermined frequency and must remain unaffected by substantial variations of the voltage of the source of alternating current to whose frequency the circuit is responsive. In other applications the frequency sensitive circuit must be sensitive to both frequency and voltage. In still other applications the frequency responsive circuit must be sensitive to both upper and lower limits of a range of frequency.

Accordingly, it is an object of my invention to provide a new and improved frequency responsive circuit.

It is another object of my invention to provide a new and improved frequency responsive circuit which is sensitive to very small changes in the frequency of an alternating current.

It is another object of my invention to provide a new and improved frequency responsive circuit which is relatively insensitive to substantial variations in the voltage of the source of alternating current to whose frequency the circuit is responsive.

It is another object of my invention to provide a new and improved frequency responsive circuit which is sensitive to very small changes in the frequency of an alternating current and is relatively insensitive to substantial varations in the voltage of the source of alternating current to whose frequency the circuit is responsive.

It is another object of my invention to provide a new and improved frequency responsive circuit for providing a direct current voltage which varies in accordance with the frequency of an alternating current.

It is another object of my invention to provide a new and improved frequency responsive circuit for actuating a relay in response to a varaition in the frequency of an alternating current.

It is another object of my invention to provide a new and improved frequency responsive circuit for providing a direct current voltage which varies in accordance with the frequency of an alternating current for actuating a relay when the frequency passes a predetermined value.

It is another object of my invention to provide a new and improved electric circuit which is responsive to the magnitude and frequency of an alternating voltage.

It is still another object of my invention to provide a new and improved frequency responsive circuit for actuating and maintaining a relay in actuated position over a predetermined range of frequency.

Briefly stated, in the illustrated embodiment of my invention I provide a new and improved frequency responsive circuit for actuating a relay when the frequency of an alternating current passes a predetermined value. The circuit comprises two serially connected elements connected across a source of the alternating current. The elements are so chosen that the impedance of one element, which may be a resistance, does not vary with the frequency of the alternating current while the impedance of the other, which may be a reactance such as an inductance or a capacitance, varies with the frequency. Since the impedance of the resistance is independent of the frequency while the impedance of the reactance varies with the frequency, the two elements will have equal voltage drops at only one predetermined frequency and the voltage unbalance will vary in accordance with the departure of the frequency of the alternating current from the predetermined frequency. Alternatively both elements may have impedances which vary with the frequency, one varying directly and the other indirectly with the frequency. In this case one element may be an inductance while the other way may be a capacitance. In this case the voltage drops of the two elements will change simultaneously, one increasing and the other decreasing with change in frequency. The voltages across the two elements are rectified by a pair of unidirectionally conducting devices and impressed on two serially connected resistances which are connected across the pair of unidirectionally conducting devices, the common connection of the two elements being connected to the common connection of the two resistances. The voltage unbalance across the two resistances is impressed on the control grid of an electric discharge means whose anode-cathode circuit is connected to a relay winding. When the frequency of the alternating current departs from the predetermined frequency in one direction the voltage impressed on the control grid of the electric discharge means renders it conductive and the relay winding is energized to actuate its associated contact. When the frequency of the alternating current falls below the predetermined frequency, the voltage impressed on the control grid is not great enough to maintain the electric discharge means conductive and the relay winding is deenergized, the relay contact returning to its original position. In order to render the electric discharge means conductive when the magnitude of the alternating voltage exceeds a predetermined value as well as when the frequency of the alternating voltage exceeds a predetermined value, the two serially connected resistances may be made unequal in value.

For a better understanding of my invention, reference may be had to the following description taken in connection with the accompanying drawing, and its scope will be pointed out in the appended claims.

Figure 1:
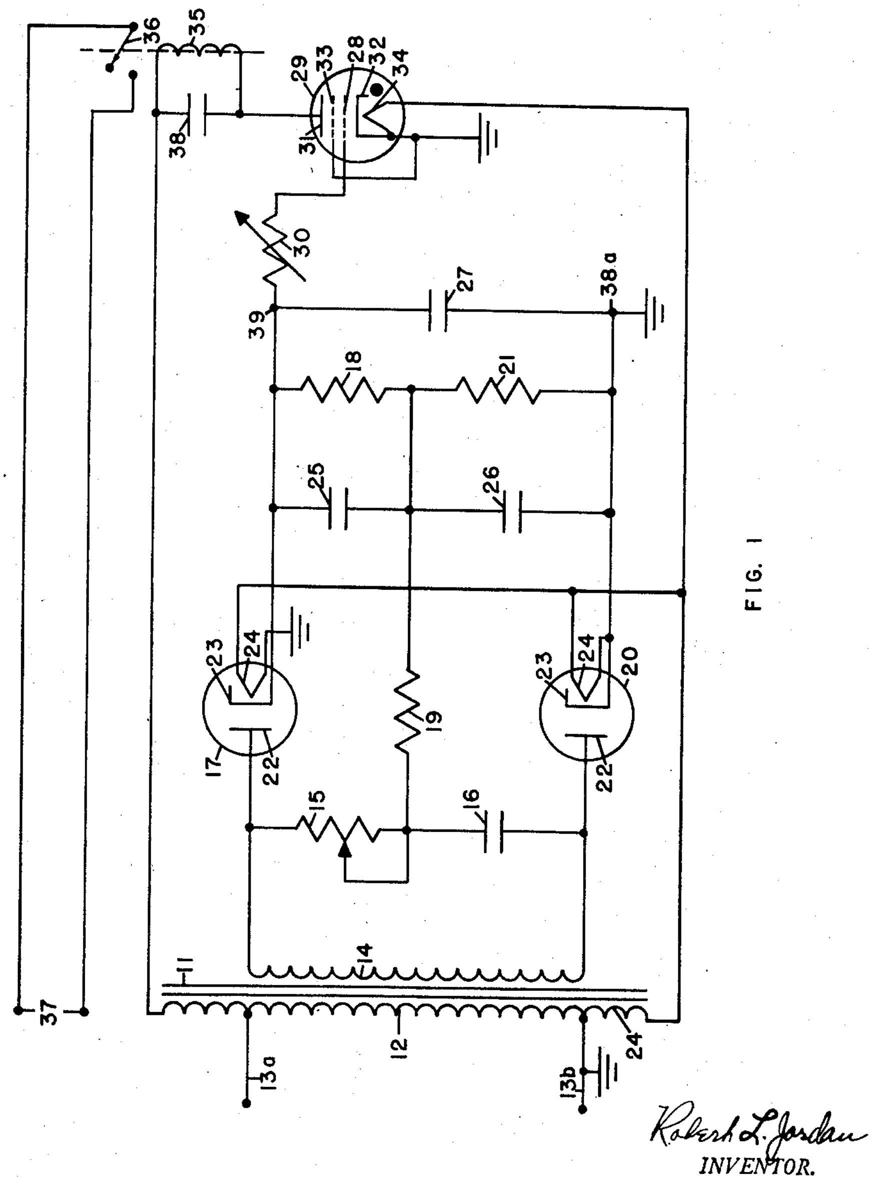
Figure 1 illustrates diagrammatically an embodiment of my invention.

Referring now to Figure 1 of the drawing, I provide a transformer 11 having a primary winding 12 provided with terminals 13*a* and 13*b* which are adapted to be connected to the source of alternating current whose frequency may fall below a predetermined value. Across the secondary winding 14 of transformer 11 are connected in series relation a variable resistance 15 and a capacitance 16. A unidirectionally conducting device such as an electric discharge means 17 and resistances 18 and 19 are connected in series relations across resistance 15. A similar unidirectionally conducting device, electric discharge 20, and resistances 21 and 19 are connected in series relation across capacitance 16. Electric discharge means 17 and 20 act as rectifiers and each is provided with an anode 22, a cathode 23 and a heating element 24 which is energized from a portion 24 of primary winding 12 lying between terminal 13*b* and the lower end of primary winding 12. Electric discharge means 17 and 18 may be of any of the several types well known in the art although I prefer to employ electric discharge means of the high vacuum type. Capacitances 25 and 26 are connected across resistances 18 and 21 respectively, to smooth out the pulsating direct current transmitted to resistances 18 and 21 by electric discharge means 17 and 20. A capacitance 27 is connected across both resistances 18 and 21 as a filter to smooth out the direct current voltage appearing across both resistances 18 and 21.

The voltage appearing across both resistances 18 and 21 is impressed on the control grid 28 of an electric valve 29 through a variable current limiting resistance 30. Electric discharge means 29 comprises an anode 31, a cathode 32, a suppressor grid 33 connected to cathode 32, and a heater element 34 energized from the portion 24 of primary winding 12. A relay winding 35 is connected in series with anode 31 across the primary winding 12 excluding portion 24 and actuates a contact 36 connected in controlled circuit 37 when electric discharge means 29 is rendered conductive. Electric discharge means 29 may be of any of the several types well known in the art although I prefer to employ an electric discharge means of the gaseous discharge type in order to obtain either full energization of relay winding 35 or no energization at all. Capacitance 38 is connected across relay winding 35 to maintain relay winding 35 in an energized condition during the half cycles of the alternating current during which a negative potential is impressed on anode 34.

When it is desired to employ the above described apparatus in an application where it is to be sensitive to frequency variations but insensitive to voltage variations, the resistances 18 and 21 are made equal. At a frequency then at which the impedances of resistance 15 and capacitance 16 are equal, the direct current voltages across resistances 18 and 21 are also equal but opposite so that no potential is impressed on control grid 28 of electric discharge means 29. Since the type of electric discharge means 29 employed is rendered conductive when a predetermined negative potential is impressed on control grid 28, a separate source of biasing potential is necessary if resistance 15 and capacitance 16 have equal impedances at the predetermined frequency at which it is desired to render electric discharge means 28 conductive. In order to avoid the use of a separate source of biasing potential, capacitance 16 and resistance 15 are of such values that at the predetermined frequency the impedance of capacitance 16 is greater than the impedance resistance 15 by an amount necessary to make the negative potential impressed on control grid 28 of such value that electric discharge means 29 is rendered conductive. The frequency at which electric discharge means 29 is rendered conductive can be easily varied by changing the value of variable resistance 15. Assuming now that the voltage across terminals 13*a* and 13*b* is maintained constant and that electric discharge means 29 is to be rendered conductive when the frequency of the alternating voltage across terminals 13*a* and 13*b* reaches a predetermined value, a negative potential is impressed on control grid 28, as long as the frequency is below the predetermined value, which maintains electric discharge means non-conductive since the impedance of capacitance 16 exceeds the impedance of resistance 15 by an amount necessary to impress the proper negative potential on control grid 28. As the frequency is increased, the impedance of capacitance 16 is decreased, the direct current voltage across resistance 21 is decreased while the direct current voltage across resistance 18 remains substantially constant, and the negative potential impressed on constant grid 28 is decreased. As the frequency continues to increase, the negative potential on control grid 28 continues to decrease and when the predetermined value of frequency is reached, electric discharge means 29 is rendered conductive and contact 36 is actuated. Further increase in frequency will have no effect on electric discharge means 29 which will remain conductive.

If the frequency is now decreased it is found that even when the frequency again reaches the predetermined value, the electric discharge means 29 remains conductive and is rendered nonconductive only at a value of frequency below the predetermined value. This variation is caused by the shunting effect of resistance 30 and the cathode 32—grid 28 circuit of electric discharge 29 across resistances 18 and 21. In some applications it is desirable to set the difference between the frequency at which electric discharge means 29 is rendered conductive and the frequency at which it is rendered nonconductive at a stated value. This difference between the two values of frequency can be varied by varying the value of resistance 30, the difference varying inversely as the value of resistance 30. The difference may be made quite small by proper choice of the values of the electrical components of the circuit.

The above described circuit can be made voltage sensitive as well as frequency sensitive by making the values of resistances 18 and 21 unequal or by making the impedances of resistance 15 and capacitance 16 substantially unequal. For example, if resistance 18 is greater than resistance 21, an increase in the alternating current voltage applied to terminals 13*a* and 13*b* will cause a greater increase in the direct current voltage across resistance 18 than in the direct current voltage across resistance 21. The potential impressed on control grid 28 will therefore be rendered less negative. The same result obtains when the impedance of resistance 15 is greater than the impedance of capacitance 16. By proper choice, therefore, of the values of the electrical components of the above described apparatus, electrical discharge means 29 can be rendered conductive not only when the frequency of the alternating voltage applied across terminals 13*a* and 13*b* exceeds a predetermined value, but also when the magnitude of the alternating voltage itself exceeds a predetermined value.

The above described circuit may be easily modified to maintain electric discharge means 29 conductive when the frequency of the alternating current across terminals 13*a* and 13*b* remains below a predetermined value and to render electric discharge means 29 nonconductive when the frequency reaches the predetermined value by connecting control grid 28 to point 38 of the circuit instead of to point 39 and grounding point 39 instead of point 38. An inductance may be substituted for capacitance 16 in the circuit illustrated in Figure 1. As will be well understood by those skilled in the art, the impedance of the inductance will vary directly with the frequency of the alternating voltage across terminals 13*a* and 13*b*. With an inductance in place of capacitance 16 the circuit illustrated will maintain electric discharge means 29 conductive as the frequency of the alternating voltage is increased until the frequency reaches a predetermined value when electric discharge means 29 will be rendered nonconductive. By connecting control grid 28 to point 38 and connecting point 39 instead of point 38 to ground, the above operation will be reversed and electric discharge means 29 will remain nonconductive as the frequency is increased until the frequency reaches a predetermined value.

Resistance 15 of the circuit illustrated in Figure 1 may also be replaced by an inductance in which case a slight increase in frequency will cause a large variation in the potential impressed on control grid 28 since the impedance will vary in opposite manner from the impedance of the capacitance 16 with change of frequency. For example, if the frequency increases the direct current voltage across resistance 18 will increase while the direct current voltage across resistance 21 will decrease. The change in the potential on control grid 28 will be the sum of the changes in the direct current voltages across resistances 18 and 21 so that slight changes in frequency will cause comparatively great changes in the potential impressed on control grid 28.

Figure 2:
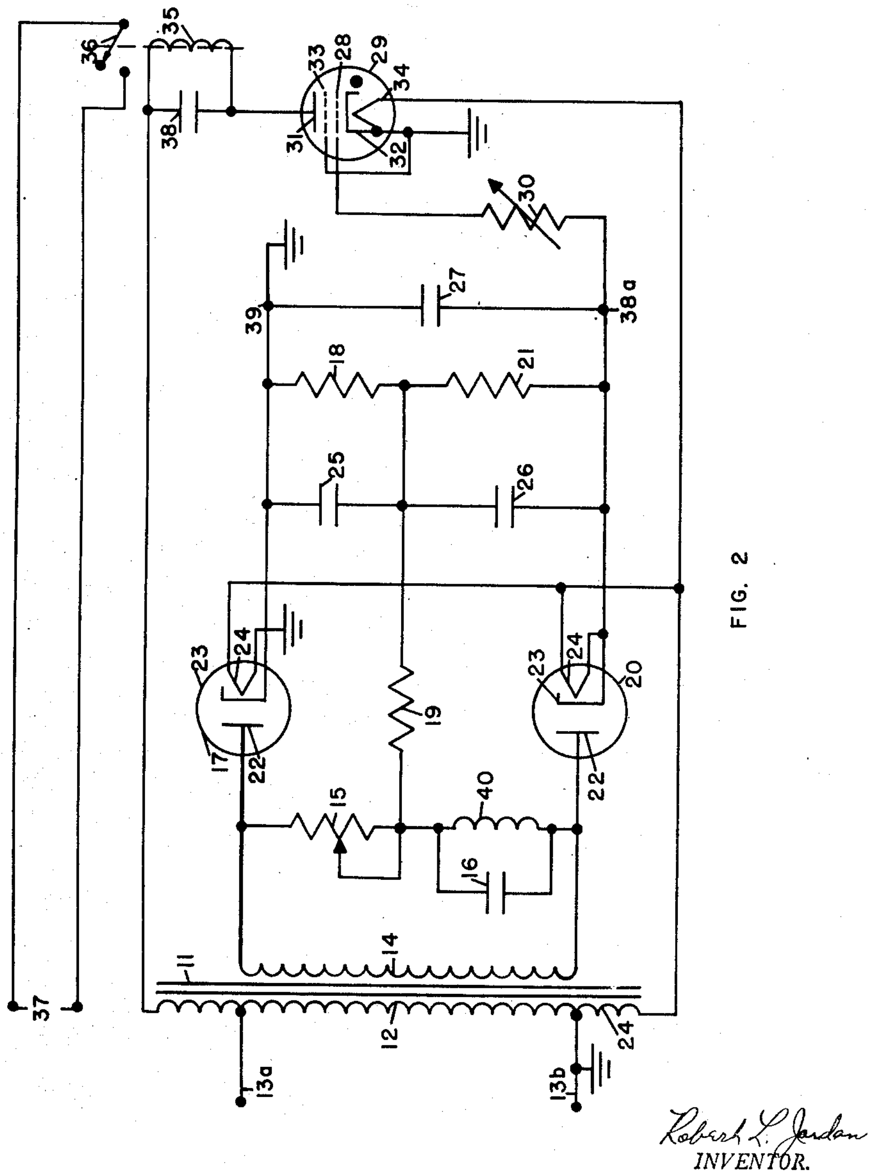
Figure 2 illustrates diagrammatically a modification of the embodiment of my invention illustrated in Figure 1.

In the embodiment of my invention illustrated in Figure 2, an inductance 40 is connected across capacitance 16 to form a resonant circuit. The element or unit composed of 16 and resistance 40 will therefore have an impedance which, with increase in frequency of the alternating voltage across terminals 13*a* and 13*b*, will first increase to a maximum value and then decrease as will be well understood by those skilled in the art. It therefore becomes possible to start operation of the circuit with the frequency of the alternating voltage at a relatively low value and electric discharge means 29 nonconductive. As the frequency of the alternating voltage increases, the impedance of the element which consists of capacitance 16 and inductance 40 increases and a less negative potential is impressed on control grid 28. As the frequency increases the potential impressed on control grid 28 will reach the value at which electric discharge means 29 is rendered conductive and relay contact 36 will be actuated. As the frequency continues to increase, the impedance of the element which comprises capacitance 16 and inductance 40 will continue to increase until the point of peak resonance is reached. Thereafter the impedance will decrease with increase of frequency and a more negative potential will be impressed on control grid 28. If the frequency continues to increase, the electric discharge means will be rendered nonconductive and contact 36 will return to its original position. In this manner, contact 36 may be maintained in its actuated position over a certain range of frequency, being in its non-actuated position below and above this range. By proper selection of the values of the electrical components, the relay contact may be maintained in actuated position over any predetermined range of frequencies. It will be well understood by those skilled in the art that the relay contact 36 may be employed to open a controlled circuit as well as to close the controlled circuit 37 as has been illustrated in the drawing.

While I have shown and described my invention as applied to particular systems and as embodying various devices diagrammatically shown, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination: an alternating current supply circuit; two elements having different impedance-frequency characteristics connected in series relation and energized from said alternating current supply circuit; a unidirectionally conducting device connected in series relation with a resistance across one of said two elements; a second unidirectionally conducting device connected in series relation with a second resistance across the other of said two elements; an electric discharge means of the gaseous discharge type provided with input electrodes including a control grid and cathode and output electrodes including an anode and said cathode, said input electrodes being connected across said first and second resistances; and load device connected in series with said output electrodes across said alternating current supply circuit for energization when said electric discharge means is rendered conductive by the potential impressed on said input electrodes.

2. The device of claim 1 and a variable resistance connected between said control grid and one of said resistances.

3. In combination: an alternating current circuit; a first resistance and a reactance connected in series relation and energized from said alternating current circuit; a first unidirectionally conducting device connected in series relation with a second resistance across said first resistance; a second unidirectionally conducting device connected in series relation with a third resistance across said reactance; an electric discharge device of the gaseous discharge type having input electrodes comprising a control grid and cathode and output electrodes comprising an anode and said cathode, said input electrodes being connected across said second and third resistances; and a load device connected in series relation with said output electrodes across said alternating current circuit for energization when said electric discharge means is rendered conductive by the potential impressed on said input electrodes; and a fourth resistance connected in series with said control grid for predetermining the frequency of the alternating current of said alternating current circuit between the points of energization and cessation of conduction of said electric discharge means, said electric discharge means being rendered conductive when the frequency of the alternating current in the alternating current circuit exceeds a predetermined value.

4. In combination: an alternating current circuit; a first resistance and a capacitance connected in series and energized from said alternating current circuit; a first unidirectionally conducting device connected in series relation with a second resistance across said first resistance; a second unidirectionally conducting device connected in series relation with a third resistance across said capacitance; an electric discharge device of the gaseous discharge type having input electrodes comprising a control grid and cathode and output electrodes comprising an anode and said cathode, said input electrodes being connected across said second and third resistances; and a load device connected in series relation with said output electrodes across said alternating current circuit for energization when said electric discharge means is rendered conductive by the potential impressed on said input electrodes.

5. In combination: an alternating current circuit; a first resistance and an inductance connected in series and energized from said alternating current circuit; a first unidirectionally conducting device connected in series relation with a second resistance across said first resistance; a second unidirectionally conducting device connected in series relation with a third resistance across said inductance; an electric discharge device of the gaseous discharge type having input electrodes comprising a control grid and cathode and output electrodes comprising an anode and said cathode, said input electrodes being connected across said second and third resistances; and a load device connected in series relation with said output electrodes across said alternating current circuit for energization when said electric discharge means is rendered conductive by the potential impressed on said input electrodes.

References Cited in the file of this patent

UNITED STATES PATENTS

| | | |
|---|---|---|
| 2,022,790 | Sturdy | Dec. 3, 1935 |
| 2,177,900 | Logan | Oct. 31, 1939 |
| 2,190,319 | Koch | Feb. 13, 1940 |
| 2,241,937 | Trevor | May 13, 1941 |
| 2,243,417 | Crosby | May 27, 1941 |
| 2,404,643 | Livingston | July 23, 1946 |
| 2,415,469 | Webb | Feb. 11, 1947 |
| 2,476,849 | Ergen | July 19, 1949 |
| 2,483,053 | Isay | Sept. 27, 1949 |
| 2,484,342 | Hart | Oct. 11, 1949 |
| 2,489,858 | Burnett | Nov. 29, 1949 |
| 2,522,893 | Purington | Sept. 19, 1950 |